US012698184B2

(12) United States Patent (10) Patent No.: US 12,698,184 B2

Chen et al. (45) Date of Patent: Aug. 4, 2026

(54) ELEVATOR POSITIONING SYSTEM WITH FREQUENCY SPECTRUM FOOTPRINTING

(71) Applicant: HONEYWELL INTERNATIONAL INC., Charlotte, NC (US)

(72) Inventors: En Yi Chen, Charlotte, NC (US); Yang Lu, Charlotte, NC (US); Hong Lei Jiang, Charlotte, NC (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 915 days.

(21) Appl. No.: 18/046,574

(22) Filed: Oct. 14, 2022

(65) Prior Publication Data

US 2023/0139261 A1 May 4, 2023

(30) Foreign Application Priority Data

Oct. 29, 2021 (CN) .......................... 202111272951.0

(51) Int. Cl.
B66B 5/00 (2006.01)
G01S 13/06 (2006.01)
(52) U.S. Cl.
CPC ............ B66B 5/0018 (2013.01); G01S 13/06 (2013.01)
(58) Field of Classification Search
CPC ...... B66B 5/0018; B66B 1/3492; G01S 13/06
See application file for complete search history.

(56) References Cited

U.S. PATENT DOCUMENTS 6,437,315 B1 * 8/2002 Skalski ................. B66B 1/3492
250/221
8,276,716 B2 * 10/2012 Meri ..................... B66B 1/3492
187/394

(Continued)

FOREIGN PATENT DOCUMENTS

CN 110143499 A * 8/2019 ............... B66B 5/00
CN 111847155 A * 10/2020 ........... B66B 1/3492

(Continued)

OTHER PUBLICATIONS

European search report Mailed on Mar. 9, 2023 for EP Application No. 22199843.

(Continued)

*Primary Examiner* — Michael A Riegelman
(74) *Attorney, Agent, or Firm* — ALSTON & BIRD LLP

(57) ABSTRACT

Various embodiments are directed to determining an elevator car position within an elevator shaft using footprint representations or descriptions of frequency spectrum data at reference positions along the elevator shaft. In one aspect, an example method is provided. The method includes determining reference frequency spectrum data for each of a plurality of reference positions along the elevator shaft and generating a footprint associated with each reference position based at least in part on a plurality of frequency peaks within the reference frequency spectrum data for each reference positions. The method further includes obtaining real-time frequency spectrum data associated with the elevator car within the elevator shaft and determining an estimated position of the elevator car based at least in part on comparing the real-time frequency spectrum data with a plurality of footprints associated with the plurality of reference positions.

8 Claims, 7 Drawing Sheets

(56)                 References Cited

U.S. PATENT DOCUMENTS

| | | | | |
|---|---|---|---|---|
| 11,235,948 | B2 * | 2/2022 | Piedra | B66B 1/28 |
| 2015/0314985 | A1 * | 11/2015 | Schoenauer | G01D 5/3473 |
| | | | | 187/394 |
| 2018/0257908 | A1 * | 9/2018 | Moeller | B66B 1/3446 |
| 2019/0062106 | A1 * | 2/2019 | Ginsberg | B66B 3/02 |
| 2019/0382238 | A1 * | 12/2019 | Witczak | B66B 5/0018 |
| 2020/0062542 | A1 * | 2/2020 | Sudi | B66B 1/3492 |
| 2020/0071126 | A1 * | 3/2020 | Sudi | B66B 1/3492 |
| 2020/0109027 | A1 * | 4/2020 | Witczak | B66B 3/02 |
| 2020/0239274 | A1 * | 7/2020 | Gurvich | B66B 1/3492 |
| 2020/0255260 | A1 * | 8/2020 | Roberts | B66B 1/28 |
| 2022/0306427 | A1 * | 9/2022 | Chen | B66B 1/3492 |
| 2023/0133336 | A1 * | 5/2023 | Chen | B66B 5/0018 |
| | | | | 187/399 |
| 2023/0137593 | A1 * | 5/2023 | Chen | B66B 1/3492 |
| | | | | 342/5 |
| 2023/0139261 | A1 * | 5/2023 | Chen | B66B 1/3492 |
| | | | | 187/393 |
| 2024/0061077 | A1 * | 2/2024 | Lu | G01S 13/88 |

FOREIGN PATENT DOCUMENTS

| | | | | |
|---|---|---|---|---|
| EP | | 3632830 A1 | 4/2020 | |
| EP | | 3640179 A1 | 4/2020 | |
| JP | | 5932577 B2 * | 6/2016 | |
| WO | WO-2025186505 A1 * | 9/2025 | | B66B 5/0037 |

OTHER PUBLICATIONS

EP Office Action Mailed on Jul. 22, 2024 for EP Application No. 22199843, 5 page(s).
EP Office Action Mailed on Dec. 12, 2025 for EP Application No. 22199843, 6 page(s).
EP Office Action Mailed on May 18, 2026 for EP Application No. 22199843, 6 page(s).

* cited by examiner

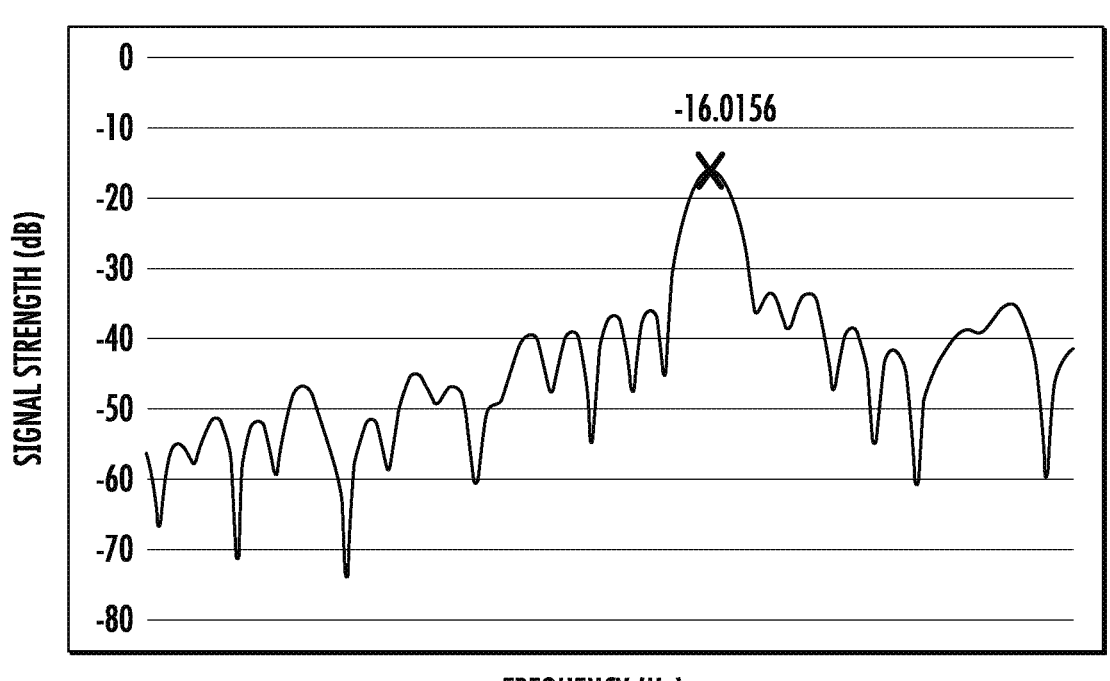
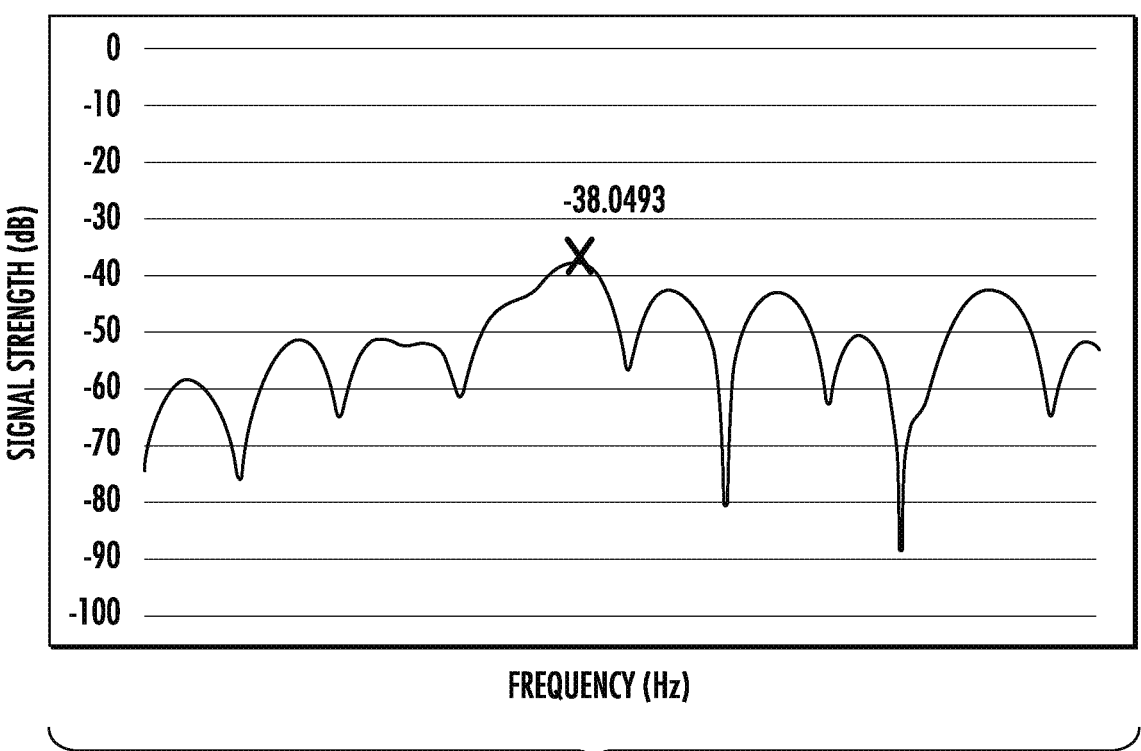
FIG. 2

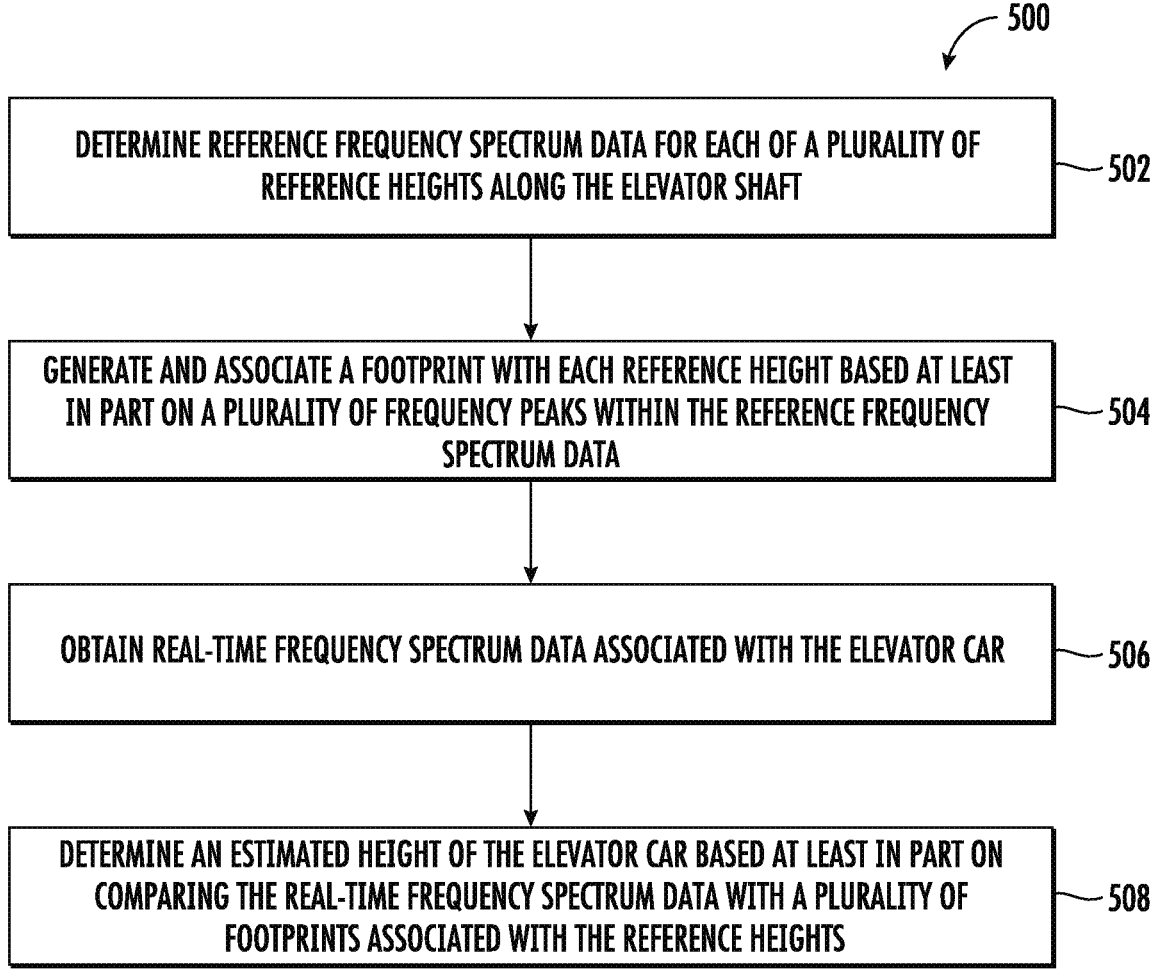

500

DETERMINE REFERENCE FREQUENCY SPECTRUM DATA FOR EACH OF A PLURALITY OF REFERENCE HEIGHTS ALONG THE ELEVATOR SHAFT — 502

GENERATE AND ASSOCIATE A FOOTPRINT WITH EACH REFERENCE HEIGHT BASED AT LEAST IN PART ON A PLURALITY OF FREQUENCY PEAKS WITHIN THE REFERENCE FREQUENCY SPECTRUM DATA — 504

OBTAIN REAL-TIME FREQUENCY SPECTRUM DATA ASSOCIATED WITH THE ELEVATOR CAR — 506

DETERMINE AN ESTIMATED HEIGHT OF THE ELEVATOR CAR BASED AT LEAST IN PART ON COMPARING THE REAL-TIME FREQUENCY SPECTRUM DATA WITH A PLURALITY OF FOOTPRINTS ASSOCIATED WITH THE REFERENCE HEIGHTS — 508

ELEVATOR POSITIONING SYSTEM WITH FREQUENCY SPECTRUM FOOTPRINTING

CROSS-REFERENCE TO RELATED APPLICATIONS

This application claims priority pursuant to 35 U.S.C. 119(a) to Chinese Application No. 202111272951.0, filed Oct. 29, 2021, which application is incorporated herein by reference in its entirety.

FIELD OF THE INVENTION

Various embodiments described herein relate generally to measurement systems used in conjunction with an elevator system, and, more particularly, to a radar-based elevator positioning system configured to detect and measure reflected radar signals within an elevator shaft.

BACKGROUND

Industrial and commercial applications may use elevator systems to facilitate the transport of people, cargo, and/or the throughout various levels of a multi-story building. In particular, an elevator positioning system may be used to monitor the relative position (e.g., the relative height) of an elevator car within an elevator shaft, such that the elevator car may move between one or more desired locations along the elevator shaft. Real-time positioning is vital for further control of the elevator car, including stop positing, unexpected car movement protection, overspeed detection, and brake permeance monitoring.

BRIEF SUMMARY

Various embodiments described herein relate to elevator positioning systems and methods for using the same. According to an aspect of the present disclosure, a method for determining a position of an elevator car within an elevator shaft is provided. In various embodiments, the method includes determining reference frequency spectrum data for each of a plurality of reference positions along the elevator shaft and generating a footprint associated with each reference position based at least in part on a plurality of frequency peaks within the reference frequency spectrum data for each reference position. The method further includes obtaining real-time frequency spectrum data associated with the elevator car within the elevator shaft and determining an estimated position of the elevator car based at least in part on comparing the real-time frequency spectrum data with a plurality of footprints associated with the plurality of reference positions.

In various embodiments, determining the estimated position of the elevator car comprises determining a coarse position estimate of the elevator car based at least in part on a reference position having a footprint that is determined to be similar to the real-time frequency spectrum data, identifying a particular frequency peak within the real-time frequency spectrum data using the reference position, and determining a fine position estimate of the elevator car using the particular frequency peak within the real-time frequency spectrum data. The particular frequency peak may correspond to a radar reflector positioned within the elevator shaft. In various embodiments, the real-time frequency spectrum data is first compared with one or more footprints associated with one or more reference positions within a threshold distance of a previously-determined fine position estimate of the elevator car. In various embodiments, comparing the real-time frequency spectrum data with a given footprint comprises determining a similarity value between the given footprint and a representation of a plurality of frequency peaks within the real-time frequency spectrum data.

In various embodiments, the footprint associated with a given reference position comprises a frequency value and a classification tag for at least a subset of the plurality of frequency peaks within the reference frequency spectrum data for the given reference position. In various embodiments, the classification tag for a respective frequency peak describes whether or not the respective frequency peak is associated with a received radar signal reflected from a radar reflector within the elevator shaft. In various embodiments, the real-time frequency spectrum data is obtained using a radar transceiver attached to the elevator car. In various embodiments, the plurality of footprints associated with the plurality of reference positions are stored in a database.

According to another aspect of the present disclosure, an apparatus for determining a position of an elevator car within an elevator shaft is provided. The apparatus comprises a processor and a memory storing executable instructions. The executable instructions are configured to, with the processor, cause the apparatus to determine reference frequency spectrum data for each of a plurality of reference positions along the elevator shaft and generate a footprint associated with each reference position based at least in part on a plurality of frequency peaks within the reference frequency spectrum data for each reference positions. The executable instructions are further configured to, with the processor, cause the apparatus to obtain real-time frequency spectrum data associated with the elevator car within the elevator shaft and determine an estimated position of the elevator car based at least in part on comparing the real-time frequency spectrum data with a plurality of footprints associated with the plurality of reference positions.

In various embodiments, determining the estimated position of the elevator car comprises determining a coarse position estimate of the elevator car based at least in part on a reference position having a footprint that is determined to be similar to the real-time frequency spectrum data, identifying a particular frequency peak within the real-time frequency spectrum data using the reference position, and determining a fine position estimate of the elevator car using the particular frequency peak within the real-time frequency spectrum data. The particular frequency peak may correspond to a radar reflector positioned within the elevator shaft. In various embodiments, the real-time frequency spectrum data is first compared with one or more footprints associated with one or more reference positions within a threshold distance of a previously-determined fine position estimate of the elevator car. In various embodiments, comparing the real-time frequency spectrum data with a given footprint comprises determining a similarity value between the given footprint and a representation of a plurality of frequency peaks within the real-time frequency spectrum data.

In various embodiments, the footprint associated with a given reference position comprises a frequency value and a classification tag for at least a subset of the plurality of frequency peaks within the reference frequency spectrum data for the given reference position. In various embodiments, the classification tag for a respective frequency peak describes whether or not the respective frequency peak is associated with a received radar signal reflected from a radar reflector within the elevator shaft. In various embodiments, the real-time frequency spectrum data is obtained using a radar transceiver attached to the elevator car. In various embodiments, the plurality of footprints associated with the plurality of reference positions are stored in a database.

According to another aspect of the present disclosure, a computer program product including at least one non-transitory computer-readable storage medium having computer-executable program code portions stored therein is provided. The computer-executable program code portions include program code instructions configured to determine reference frequency spectrum data for each of a plurality of reference positions along the elevator shaft and generate a footprint associated with each reference position based at least in part on a plurality of frequency peaks within the reference frequency spectrum data for each reference positions. The computer-executable program code portions include program code instructions further configured to obtain real-time frequency spectrum data associated with the elevator car within the elevator shaft and determine an estimated position of the elevator car based at least in part on comparing the real-time frequency spectrum data with a plurality of footprints associated with the plurality of reference positions.

In various embodiments, determining the estimated position of the elevator car comprises determining a coarse position estimate of the elevator car based at least in part on a reference position having a footprint that is determined to be similar to the real-time frequency spectrum data, identifying a particular frequency peak within the real-time frequency spectrum data using the reference position, and determining a fine position estimate of the elevator car using the particular frequency peak within the real-time frequency spectrum data. The particular frequency peak may correspond to a radar reflector positioned within the elevator shaft. In various embodiments, the real-time frequency spectrum data is first compared with one or more footprints associated with one or more reference positions within a threshold distance of a previously-determined fine position estimate of the elevator car. In various embodiments, comparing the real-time frequency spectrum data with a given footprint comprises determining a similarity value between the given footprint and a representation of a plurality of frequency peaks within the real-time frequency spectrum data.

In various embodiments, the footprint associated with a given reference position comprises a frequency value and a classification tag for at least a subset of the plurality of frequency peaks within the reference frequency spectrum data for the given reference position. In various embodiments, the classification tag for a respective frequency peak describes whether or not the respective frequency peak is associated with a received radar signal reflected from a radar reflector within the elevator shaft. In various embodiments, the real-time frequency spectrum data is obtained using a radar transceiver attached to the elevator car. In various embodiments, the plurality of footprints associated with the plurality of reference positions are stored in a database.

BRIEF DESCRIPTION OF THE DRAWINGS

Reference will now be made to the accompanying drawings, which are not necessarily drawn to scale, and wherein:

FIG. 2 illustrates example data describing technical challenges relating to multi-path interference for radar-based distance measurements when determining a position of an elevator car within an elevator shaft.

FIG. 5 illustrates a flowchart of exemplary operations performed for determining a position of an elevator car within an elevator shaft using frequency data footprints associated with reference positions along the elevator shaft, in accordance with various embodiments of the present disclosure.

DETAILED DESCRIPTION

Figure 1:
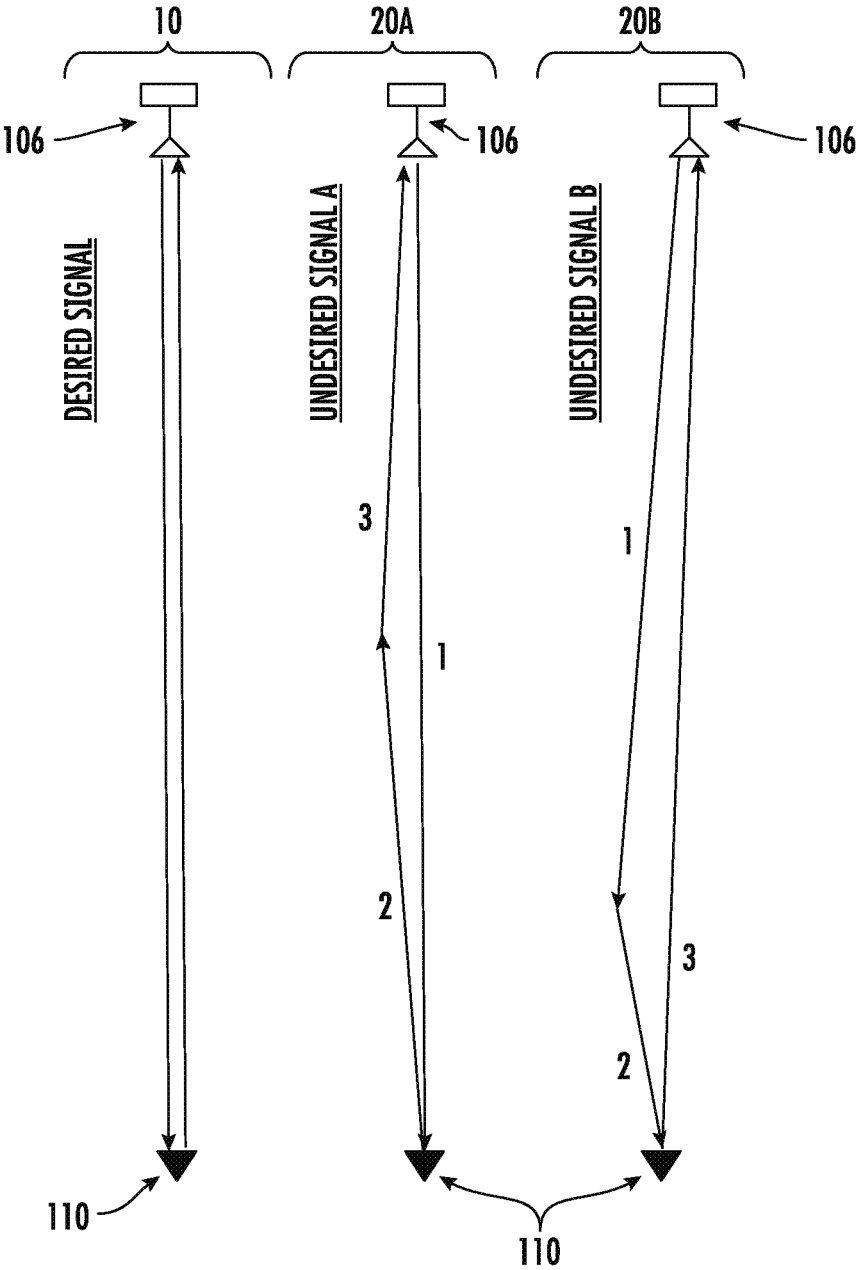
FIG. 1 provides a diagram illustrating technical challenges relating to multi-path interference for radar-based distance measurements when determining a position of an elevator car within an elevator shaft.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

It should be understood at the outset that although illustrative implementations of one or more aspects are illustrated below, the disclosed assemblies, systems, and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents. While values for dimensions of various elements are disclosed, the drawings may not be to scale.

The words "example," or "exemplary," when used herein, are intended to mean "serving as an example, instance, or illustration." Any implementation described herein as an "example" or "exemplary embodiment" is not necessarily preferred or advantageous over other implementations.

Elevator positioning systems may use radar-based distance measurements for accurate and precise determinations of a position of an elevator car within an elevator shaft. As understood by those of skill in the field to which the present disclosure pertains, radar-based distance measurements may rely on emitting radar signals, and detecting and measuring reflections of the radar signals from one or more radar reflectors positioned along the elevator shaft. However, in some examples, multi-path interference of radar signals may cause signal strength of the detected reflections of the radar signals to be unstable or inconsistent. In particular, radar signals reflected by a single radar reflector positioned within the elevator shaft may be detected with unstable and inconsistent signal strength, causing difficulty in consistently distinguishing such radar signals reflected by a radar reflector from other reflected radar signals.

In some examples, multi-path interference of radar signals may be caused by the radar signals being emitted in a conical fashion. In some examples, radar signals may be emitted at a conical angle between approximately 0.2 degrees and approximately 5 degrees (e.g., from a vertical axis). In some other examples, radar signals may be emitted by conical angles between approximately 0.4 degrees and approximately 2 degrees. In further examples, radar signals may be emitted by conical angles between approximately 0.5 degrees and approximately 1.5 degrees. As a result, at least some of the emitted radar signals may be mis-directed away from a targeted radar reflector, may reach a radar reflector with an undesired vertical angle, may reach the radar reflector after other undesired reflections off other objects, and/or the like.

Further, in some examples, radar reflectors may be positioned (e.g., inadvertently) with a horizontal tilt angle, similarly causing at least some reflected radar signals to be mis-directed away from the radar transceiver configured to detect the reflected radar signals, to reach the radar transceiver with an undesired vertical angle, and/or to reach the radar transceiver after other undesired reflections. For example, a radar reflector 110 attached or mounted to a rail fixture of the elevator shaft via a screw may drop over time and/or in response to external forces. Similarly then, at least some of the reflected radar signals may be mis-directed away from the radar transceiver, may reach the radar transceiver with an undesired vertical angle, may reach the radar transceiver after other undesired reflections off other objects, and/or the like.

FIG. 1 compares an example ideal scenario of radar signal reflection and detection with example undesired scenarios in which reflected radar signals may be detected with unstable or inconsistent signal strength, causing inaccurate distance measurements. In the example ideal scenario 10, radar signals that are emitted by the radar transceiver 106 directly travel to and back from a radar reflector 110 and may then at least approximately represent and/or describe a direct or a substantially straight-line distance between the radar transceiver 106 and the radar reflector 110. In contrast, in example undesired scenario 20A, horizontal tilt of a radar reflector 110 causes at least some reflected radar signals to travel along an undesired path (e.g., paths "2" and "3") after being reflected by the radar reflector 110, causing multi-path interference with other reflected radar signals that may travel directly back to a radar transceiver 106 in a desired path (e.g., as described by ideal scenario 10). Similarly, in example undesired scenario 20B, conical transmission of radar signals may cause at least some radar signals to travel along an undesired path (e.g., paths "1" and "2") before reaching the radar reflector 110, also causing multi-path interference. In these examples, undesired paths of the radar signals may result from undesired reflections and impacts of the radar signals against sidewalls of the elevator shaft and/or other fixtures or objects within the elevator shaft.

Thus, in some examples, while certain radar signals may travel along a desired path (e.g., a direct path between radar transceiver 106 and radar reflector 110) by which the certain radar signals may at least approximately represent or describe a distance between the radar transceiver 106 and the radar reflector 110, other radar signals may travel along un-desired paths that may cause mis-representation or inconsistent description of a distance between the radar transceiver 106 and the radar reflector 110. FIG. 2 demonstrates difficulty in identifying a frequency peak that is associated with a radar reflector in frequency spectrum data generated based at least in part on the detection of reflected radar signals. For example and as shown in the left plot of FIG. 2, at some points in time whenever a sufficient amount of radar signals travel along the desired path, a frequency peak associated with the radar reflector 110 can be clearly identified, from which a distance between the radar transceiver 106 and the radar reflector 110 can be at least approximately determined. However, at other points in time whenever an insufficient amount of radar signals travel along the desired path and a significant amount of radar signals travel undesirably, peak association with a radar reflector is unclear, as shown in the right plot of FIG. 2, thereby causing difficulty in determining a distance between the radar transceiver 106 and the radar reflector 110. To address these technical challenges, various embodiments of the present disclosure are directed to determining a position of an elevator car within an elevator shaft based at least in part on footprints that may holistically represent frequency spectrum data collected at reference heights or positions within the elevator shaft.

Various embodiments of the present disclosure are further configured to address technical challenges in determining elevator car position that relate to unknown and/or inconsistent initial positioning of the elevator car. In particular, in various example instances, operation of the elevator car may be paused or stopped according to a time of day or other non-position-based criteria (e.g., routine maintenance, daily building closure), and as a result, operation of the elevator car may initiate at an unknown and inconsistent initial height within the elevator shaft. In some examples then, there may be difficulty in using tracking mechanisms, which, as understood by those of skill in the field of the present disclosure, involve coarsely estimating a current elevator car height reliant upon a given initial height of the elevator car and a given speed of the elevator car. In this regard, various embodiments provide technical solutions through identification of a reference height using an associated footprint and use of the reference height for analysis of real-time frequency spectrum data for an accurate elevator car height, thereby precluding dependency on a given initial height and a given initial speed.

Therefore, various embodiments described herein relate to elevator positioning systems and methods for using the same that provide determination of elevator car position based at least in part on frequency spectrum footprints associated with reference heights along the elevator shaft. In particular, various embodiments described in the present disclosure reduce difficulty caused by multi-path interference by exploiting consistently detected radar signals that reflect (e.g., undesirably) off of other fixtures within the elevator shaft, and various embodiments further enable elevator car position tracking without knowledge of an initial height and speed of the elevator car. Various embodiments are directed to determining elevator car position based at least in part on generation of footprints describing features of frequency spectrum data at reference positions along the elevator shaft, referencing real-time frequency spectrum data with the footprints, and determining an estimated position of the elevator car using a particular footprint and associated reference position.

In various embodiments, frequency spectrum data collected by a radar transceiver 106 includes various frequency peaks that are associated with radar signals that reflected off various objects, including radar reflectors and other objects. As an elevator shaft has an inherent infrastructure, frequency spectrum data collected by the same height may include consistent patterns or features. Thus, a frequency spectrum footprint can be generated to holistically represent and/or describe consistent features within frequency spectrum data collected at a particular height. The frequency spectrum footprint may include frequency values of certain peaks in the frequency spectrum data, peak amplitudes, and/or other features of the frequency spectrum data. In various embodiments, a footprint may be a vector, a matrix, an array, a data object, a data structure, embeddings, and/or the like, and a plurality of footprints may be stored in a database associated with and/or accessible by an elevator positioning system.

With footprints representing and describing frequency spectrum data at various reference heights, elevator car position can be determined based at least in part on comparing real-time frequency spectrum data with the footprints. A reference height having a footprint that is similar to the real-time frequency spectrum data (e.g., the real-time frequency spectrum data has peaks, features, characteristics that are similarly or approximately described by the footprint) can then be used in place of a coarse position estimate determined from a given initial height and given speed. In various embodiments, the reference height can be used first as a coarse estimate of elevator car position, and the reference height may then assist in identification of a particular frequency peak within the real-time frequency spectrum data (e.g., that corresponds to a radar reflector) from which an accurate position determination can be made.

Thus, various embodiments provide various technical effects and technical advantages in determining a position of an elevator car within an elevator shaft. Through the use of footprints describing consistent features of frequency spectrum data at various reference heights, real-time frequency spectrum data can be compared to various footprints to determine an estimated position of the elevator car in spite of multi-path interference. The description of consistent features by footprints can be understood as an exploitation of the inherent and relatively consistent infrastructure of the elevator shaft. Further, various embodiments provide determination of elevator car position with improved and wide applicability, as the elevator car position can be determined without knowledge of an initial position and/or speed of the elevator car.

In some examples, elevator positioning systems in accordance with various embodiments of the present disclosure are configured to accurately and precisely determine a position (e.g., an elevation, a level) of an elevator car within an elevator shaft with an error of less than approximately 10 millimeters, thereby satisfying various industry standards and requirements (e.g., standard GB-7588). In some example embodiments of the present disclosure, the position of an elevator car can be determined or estimated with an error of less than approximately 20 millimeters in either direction (e.g., above a true position, below a true position). In some example embodiments of the present disclosure, the position of an elevator car is determined or estimated with an error of less than approximately 10 millimeters in either direction. In some example embodiments of the present disclosure, the position of an elevator car is preferably determined or estimated with an error of less than approximately 8 millimeters in either direction. In some example embodiments of the present disclosure, the position of an elevator car is preferably determined or estimated with an error of less than approximately 5 millimeters in either direction.

Figure 3:
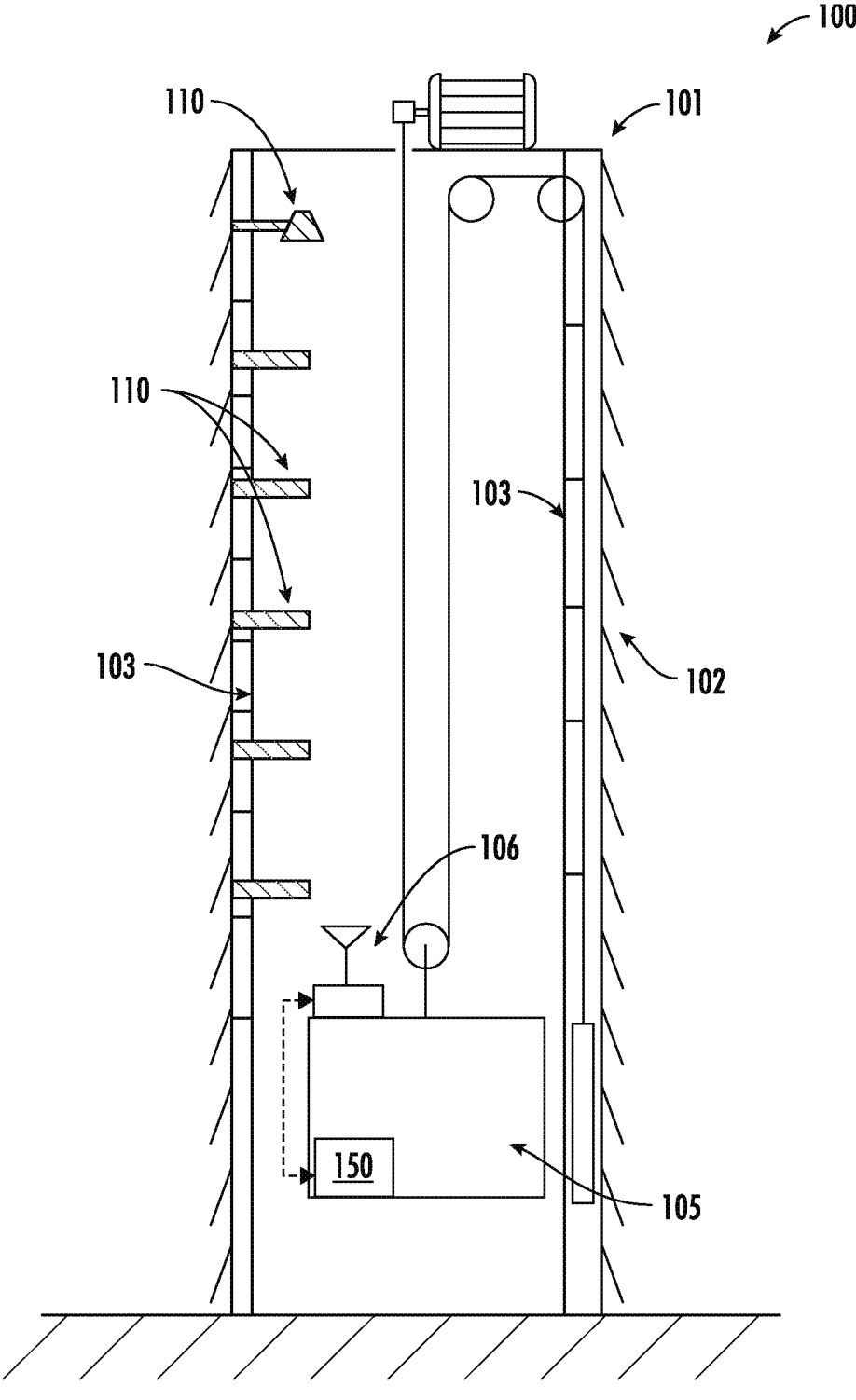
FIG. 3 schematically illustrates an exemplary elevator positioning system in accordance with various embodiments.

FIG. 3 schematically illustrates an exemplary elevator positioning system 100 according to various embodiments described herein. The elevator positioning system 100 is configured for determining a position (e.g., a height) of an elevator car 105 within the elevator shaft 101. For example, an elevator positioning system 100 may be configured to determine the relative position (e.g., the relative height) of an elevator car within an elevator shaft as measured in a vertical direction (e.g., a direction extending parallel to a central axis of the elevator shaft along a height of the elevator shaft).

In various embodiments, the elevator positioning system 100 comprises a controller 150, and in some examples, the controller 150 is configured to determine the position of the elevator car 105 based at least in part on radar-based distance measurements, specifically measurements of a distance between a radar transceiver 106 and one or more radar reflectors 110. In various embodiments, the controller 150 may be additionally configured to determine the position of the elevator car 105 based at least in part on comparing real-time frequency spectrum data with footprints describing historically-collected frequency spectrum data at various reference heights within the elevator shaft. The controller 150 may be in electronic communication with (e.g., electronically coupled with) the radar transceiver 106 and may accordingly receive data from the radar transceiver 106 describing reflected radar signals (e.g., the frequency spectrum data). In some embodiments, the controller 150 may communicate wirelessly with the radar transceiver 106. While FIG. 3 illustrates the controller 150 being positioned with and/or within the elevator car 105 for electronic coupling and connection with the radar transceiver 106, the controller 150 may alternatively be positioned within the elevator shaft 101 or outside of an internal shaft portion of the elevator shaft 101 as enabled in part by wireless communication with the radar transceiver 106, in some example embodiments. In some example embodiments, the controller 150 may additionally be configured to operate the elevator car 105, such as causing movement of the elevator car between different positions, or otherwise providing other functionality related to the elevator car (e.g., monitoring of elevator car speed, navigation between requested levels or floors, operation of elevator car doors, audio messaging for passengers).

Generally, the elevator shaft 101 may comprise an internal shaft portion configured to house an elevator car 105 such that a full range of motion of the elevator car 105 exists within the internal shaft portion of the elevator shaft. As illustrated, the internal shaft portion of the elevator shaft 101 may be defined within a plurality of outer walls of the elevator shaft 101, such as, for example, a top shaft surface, a bottom shaft surface, and one or more sidewalls 102 extending in a substantially vertical direction between the top shaft surface and the bottom shaft surface. In various embodiments, the elevator shaft 101 comprises one or more rail fixtures 103 attached to one or more sidewalls 102, and the elevator car 105 is configured to travel in a guided movement along the rail fixtures. For example, the elevator car 105 comprises wheels configured to interface with the rail fixtures 103 for smooth, continuous, and guided movement of the elevator car 105.

In various embodiments, a shaft height of the elevator shaft 101 may be defined by a distance between the top shaft surface and the bottom shaft surface, as measured in the vertical direction. For example, in various embodiments, one or more of the top shaft surface and the bottom shaft surface may be centered about the central axis of the elevator shaft 101 such that a perpendicular axis extending from a center of the respective surface may be coaxial with the central axis of the elevator shaft 101. Further, in various embodiments, one or more of the top shaft surface and the bottom shaft surface may comprise at least substantially planar surfaces extending along a horizontal plane. As a non-limiting example, each of the top shaft surface and the bottom shaft surface may extend along a respective horizontal plane such that the top shaft surface and the bottom shaft surface are parallel to one another. In such an exemplary configuration, the height of the elevator shaft may be defined by the distance along the central axis of the elevator shaft 101 between the top shaft surface and the bottom shaft surface. In various embodiments, the elevator positioning system 100 (e.g., the controller 150) is configured to determine a relative height of the elevator car 105 within the elevator shaft 101. For example, the relative height of the elevator car 105 may reference and/or be a fraction of the height of the elevator shaft 101. In another non-limiting example, a relative height within the elevator shaft 101 may be in reference to the bottom shaft surface of the elevator shaft 101.

In various embodiments, an elevator car 105 disposed within an elevator shaft 101 may be configured in a substantially level configuration wherein a top car surface and a bottom car surface each comprise an at least substantially planar surface extending along respective horizontal planes, each plane being perpendicular to the vertical direction, as described herein. For example, the top car surface and the bottom car surface may be parallel to one another. Further, in various embodiments, the top car surface and the bottom car surface may be parallel to one or more of the top shaft surface and the bottom shaft surface. In various embodiments, the elevator car 105 is substantially level based at least in part on configuration and control of the wheels of the elevator car interfacing with the rail fixtures.

As illustrated, in various embodiments, the elevator car 105 may be configured such that the top car surface is arranged in an upward-facing configuration so as to face toward the top shaft surface of the elevator shaft 101 positioned vertically above the elevator car 105. Further, in various embodiments, the elevator car 105 may be configured such that bottom car surface is arranged in a downward-facing configuration so as to face toward the bottom shaft surface of the elevator shaft 101 positioned vertically beneath the elevator car 105. In various embodiments, an elevator car 105 may be installed within an elevator shaft 101 in an at least partially suspended configuration such that one or more gravitational forces acting on the elevator car 105 may stabilize the bottom car surface in an at least substantially horizontal configuration perpendicular to the vertical direction.

In various embodiments, the elevator car 105 may have a range of motion within the internal shaft portion of the elevator shaft 101 that may be defined in an at least substantially vertical direction by the rail fixtures 103. With controlled motion of the elevator car 105 (e.g., for delivery of people, cargo, and/or the like between different levels of a building), the position or height of the elevator car 105 within the elevator shaft may be variable over time, and the elevator positioning system 100 is configured to determine a position of the elevator car 105 at different timepoints and to record a time-dependent or time-variable profile of elevator car position.

Generally, the position of the elevator car 105 may be in reference to the position of a particular portion of the elevator car 105 within the elevator shaft 101. For example, the position of the elevator car may specifically describe the relative position or level at which the bottom car surface of the elevator car 105 is at within the elevator shaft 101. As another non-limiting example, the position of the elevator car 105 may specifically describe the relative position or level at which the top car surface of the elevator car 105 is at within the elevator shaft 101. In various embodiments, the estimated position of the radar transceiver 106 specifically is determined, such as by comparing real-time frequency spectrum data to footprints for reference heights, and the estimated position of the radar transceiver 106 may be used to determine a relative position of the elevator car 105 with respect to some portion (e.g., the bottom car surface) of the elevator car 105. For example, the radar transceiver 106 is mounted or installed on a top car surface of an elevator car 105 having a ten meter height, and using a determined position of the radar transceiver 106, the relative position of the bottom car surface of the elevator car 105 is determined to be ten meters below the determined position of the radar transceiver 106. As another example, a ten meter-spanning position for the elevator car 105 can be determined (e.g., below the determined position of the radar transceiver 106). That is, in some example embodiments, the position of the elevator car 105 is a range of relative heights or levels within the elevator shaft 101 according to the dimensions of the elevator car 105 (e.g., a height from the bottom car surface to the top car surface). In various embodiments, determination of a relative height of the elevator car 105 within the elevator shaft 101 may be followed by determination of a three-dimension position of particular portions or points (e.g., corners of the elevator car 105, the wheels of the elevator car 105) within the elevator shaft 101.

As described herein, in various embodiments, the elevator positioning system 100 may comprise a radar transceiver 106 configured to emit a signal (e.g., a RF wave, a radar wave, and/or the like) and receive a reflection comprising at least a portion of the emitted signal reflected back from one or more radar reflectors 110 of the elevator positioning system 100. That is, generally, the radar transceiver 106 is configured to transmit original radar signals (e.g., pre-reflection, non-reflected, outbound) and to receive reflected radar signals. As a non-limiting example, in various embodiments, the radar transceiver 106 may comprise a single chip, Frequency Modulation Continuous Wave (FMCW) element be configured to emit a signal comprising a 60 GHz radar wave. In further examples, the radar transceiver 106 is configured to emit signals comprising radar waves having frequencies between approximately 30 GHz and approximately 400 GHz. In some examples, the radar transceiver 106 is configured to emit signals comprising radar waves having frequencies between approximately 20 GHz and approximately 100 GHz. In some further examples, the radar transceiver 106 is configured to emit signals comprising radar waves having frequencies between approximately 5 MHz to approximately 100 GHz. In some further examples, the radar transceiver 106 is configured to emit signals comprising radar waves having frequencies between approximately 60 GHz to approximately 64 GHz to determine transceiver signal data. As a non-limiting example, in various embodiments, the radar transceiver 106 may be configured to detect one or more signals present within an elevator shaft (e.g., radar signals reflected by radar reflectors 110) using a dielectric lens antenna.

In various embodiments, a radar transceiver 106 may be configured to receive a reflection and subsequently transmit transceiver signal data indicative of the detected reflection to a controller 150, as described herein. Specifically, the radar transceiver 106 may be configured to detect (e.g., receive) a reflection and generate transceiver signal data corresponding at least in part to the received reflection. For example, in various embodiments, transceiver signal data may embody a reflection, data corresponding to a reflection, and/or the like, that is configured for conversion and/or transmission as an output electric signal. In various embodiments, frequency spectrum data is generated based upon the transceiver signal data; for example, the frequency spectrum data is the Fourier transform of the transceiver signal data. In one example embodiment, the frequency spectrum data includes approximately 32768 discrete data points based upon 1024 discrete data points of transceiver signal data. In some examples, the frequency spectrum data includes between approximately 25000 discrete data points and approximately 40000 discrete data points. In some examples, the frequency spectrum data includes between approximately 30000 discrete data points and approximately 35000 discrete data points. In some examples, the frequency spectrum data includes between approximately 32000 discrete data points and 33000 discrete data points.

In various embodiments, the radar transceiver 106 is in communication and/or electronically connected to the controller 150 that may be configured to facilitate communication and functional control therebetween. For example, the radar transceiver 106 may be configured to transmit transceiver signal data to controller 150, which may be configured to receive and/or process the transceiver signal data so as to facilitate the car position detection operation of the elevator positioning system 100, as described in further detail herein. By way of further non-limiting example, in various embodiments, transceiver signal data from the radar transceiver 106 may be processed by the controller 150 in order to determine an estimated position of the radar transceiver 106 relative to various reference heights within the elevator shaft 101, specifically by comparing the transceiver signal data with footprints generated from previously-collected transceiver signal data. In various embodiments, the transceiver signal data, or frequency spectrum data, includes various frequency peaks, and each frequency peak may correspond to a reflected radar signal (e.g., reflected from a radar reflector 110, reflected from some object of and/or within the elevator shaft 101) with adequate signal strength.

In various embodiments, the transceiver signal data comprises data points describing signal strengths of detected radar signals, as well as the signal phase of the detected radar signals. In some examples, the frequency spectrum data may be determined or derived from these data points. For example, the frequency spectrum data is generated based at least in part on performing Fourier transformation (e.g., Fast Fourier Transform) on the signal strength/signal phase data points of the transceiver signal data. In some example embodiments, the transceiver signal data may be processed by the controller 150 (e.g., using Fourier transformation) to generate frequency spectrum data.

In various embodiments, a radar transceiver 106 is attached to a surface such that the radar transceiver 106 is disposed within the internal shaft portion of the elevator shaft 101 and arranged in an at least substantially vertical configuration (e.g., facing a vertically upward direction, facing a vertically downward direction). In various embodiments, the radar transceiver 106 is oriented vertically to emit radar signals as a wavefront such that at least some radar signals may reflect against reflecting surfaces (e.g., radar reflectors 110) that are horizontally parallel with the radar transceiver 106.

In particular, at least some of the reflecting surfaces against which radar signals emitted by the radar transceiver 106 may reflect include one or more radar reflectors 110 positioned within the elevator shaft 101. As illustrated in FIG. 3, radar reflectors 110 may each be positioned at a different position or relative height along the elevator shaft 101, such as in a vertical sequence, in some examples. In some embodiments, each radar reflector 110 is associated with a unique and/or sequential identifier. As a non-limiting example reference as used herein in the present disclosure, the radar reflector 110 nearest the top shaft surface may be considered to be the "first" radar reflector 110, while the radar reflector 110 nearest the bottom shaft surface may be considered to be the "last" radar reflector 110. However, it will be understood that this sequential order of radar reflectors 110 is non-limiting and used in a descriptive manner, and other sequential orders of radar reflectors 110 may be used to describe and/or understand various embodiments described herein. In some embodiments, at least one reflector 110 may be attached to the top shaft surface, as illustrated in FIG. 3. In various embodiments, the plurality of radar reflectors 110 are approximately parallel with a horizontal plane or axis of the radar transceiver 106.

In various embodiments, a radar reflector 110 is configured for radar signal reflection, and preferably reflects radar signals such that the reflected radar signals are detected by the radar transceiver 106 with optimal signal strength. For example, a radar reflector 110 may be a substantially flat or planar reflecting plate, slab, and/or the like being substantially horizontally parallel with the radar transceiver 106. In some example embodiments, for example, at least one of the plurality of radar reflectors 110 is a pyramidal or pyramidal frustum radar reflector with a perpendicular apex (e.g., a projected apex) configured to directly reflect radar signals back to the radar transceiver 106. In some example embodiments, a radar reflector 110 includes two or more reflecting objects, such as two or more pyramidal frustum radar reflectors, and the reflecting objects of the radar reflector 110 are arranged in a particular geometric arrangement such that radar signals reflected by the radar reflector 110 have a unique signature distinguishable from other objects within the elevator shaft and/or from other radar reflectors 110. Similarly, in some example embodiments, a radar reflector 110 and/or objects thereof are configured in a particular geometric shape such that radar signals reflected by the radar reflector 110 have a unique and distinguishable signature. For instance, a radar reflector 110 is and/or comprises a pyramidal frustum reflector having a particular number of side panels to form a base plane with a particular geometric shape.

In various embodiment, at least some of the plurality of radar reflectors 110 may be configured for and exhibit dynamic movement to a certain extent in order to better distinguish such radar reflectors 110 in transceiver signal data. In some example instances, such dynamic movement may cause radar signals reflected by such radar reflectors 110 to have a unique signature. In some example embodiments, one or more radar reflectors 110 may continuously and/or intermittently rotate with respect to one or more axes such that radar signals reflected specifically by the one or more radar reflectors 110 are distinguishable from other objects (e.g., other radar reflectors 110) within the elevator shaft. In some example embodiments, a radar reflectors 110 may comprise two or more independently mobile reflecting objects, which similarly cause reflected radar signals to be particularly distinguishable. In various example embodiments, at least some of the plurality of radar reflectors 110 may be fixedly or statically positioned.

Other various objects of and/or within the elevator shaft 101 may be capable of reflecting radar signals, albeit with various different absorption/reflection coefficients. In various example embodiments, radar signals emitted by the radar transceiver 106 may reflect against rail fixtures 103, sidewalls 102, light fixtures, pulley mechanisms, support beams or structures, and/or the like, and the radar transceiver 106 may detect these reflections of radar signals. It may be appreciated however that certain of these objects may not be substantially horizontally parallel with the radar transceiver 106, and the radar transceiver 106 may detect respective reflected radar signals with different signal strengths. In various embodiments, some of these reflecting surfaces, such as rail fixtures 103, are relatively static or inherent within the elevator shaft 101, and radar signals reflected against these reflecting surfaces can be detected consistently at some positions.

In the illustrated embodiment of FIG. 3, the radar transceiver 106 is attached to the top car surface of the elevator car 105 and oriented in an upwards-facing configuration, thereby oriented to detect reflected radar signals reflected from a downward-facing reflecting surfaces (e.g., surfaces of radar reflectors 110, portions of a rail fixture 103). In some embodiments, the radar transceiver 106 is attached to a bottom car surface of the elevator car 105 and oriented in a downwards-facing configuration, thereby oriented to detect reflected radar signals reflected from an upward-facing reflecting surfaces. In some example embodiments, the elevator positioning system 100 comprises at least two radar transceivers 106 attached to both the top car surface in an upwards-facing configuration and the bottom car surface in a downwards-facing configuration. In other non-limiting example embodiments, one or more radar transceivers 106 may be attached to a side car surface in a vertical orientation (e.g., upwards-facing, downwards-facing).

Figure 4:
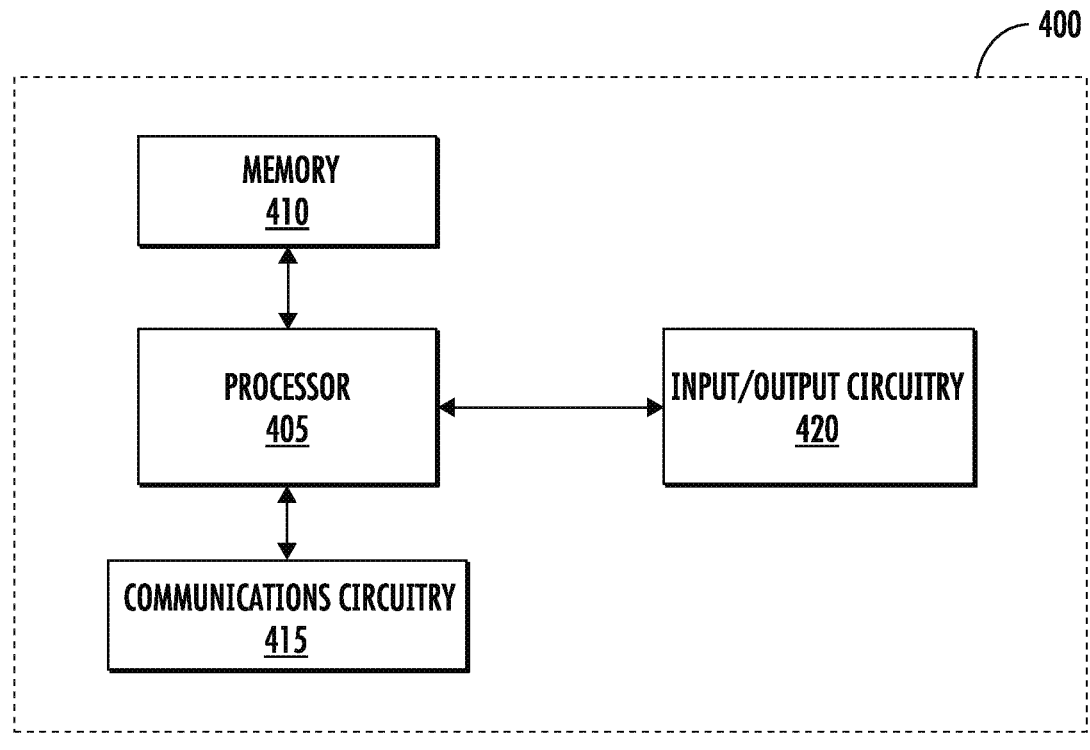
FIG. 4 schematically illustrates an exemplary apparatus for implementing various embodiments of the present disclosure.

Referring now to FIG. 4, an exemplary block diagram of an apparatus 400 configured for performing operations for determining a position of the elevator car 105 within the elevator shaft 101 using footprints that represent and describe frequency spectrum data at reference positions. In various embodiments, the apparatus 400 may embody (e.g., may be an embodiment of, may comprise, may be coupled to, may remotely control, may simulate, may communicate with) the controller 150 of the elevator positioning system 100. As illustrated in FIG. 4, the apparatus 400 may comprise a processor 405, a memory 410, communications circuitry 415, and input/output circuitry 420. The apparatus 400 may be configured to execute (e.g., perform) one or more of the various operations described herein. Although the components are described with respect to functional limitations, it should be understood that the particular implementations necessarily include the use of particular hardware. It should also be understood that certain of the components described herein may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus 300 should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 400 provide or supplement the functionality of particular circuitry. For example, the processor 405 may provide processing functionality, the memory 410 may provide storage functionality, the communications circuitry 415 may provide network interface functionality, and the like.

In some embodiments, the processor 405 (and/or co-processor or any other processing circuitry assisting or otherwise associated with the processor) may be in communication with the memory 410 via a bus for passing information among components of the apparatus. The memory 410 may be non-transitory and may include, for example, one or more volatile and/or non-volatile memories. For example, the memory 410 may be an electronic storage device (e.g., a computer readable storage medium). In various embodiments, the memory 410 may be configured to store information, data, content, applications, instructions, or the like, for enabling the apparatus to carry out various functions in accordance with example embodiments of the present disclosure. It will be understood that the memory 410 may be configured to store partially or wholly any electronic information, data, data structures, embodiments, examples, figures, processes, operations, techniques, algorithms, instructions, systems, apparatuses, methods, look-up tables, or computer program products described herein, or any combination thereof. For example, the memory 410 may be configured to store footprints that represent or describe frequency spectrum data at reference positions.

The processor 405 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 405 may be configured to execute instructions stored in the memory 410 or otherwise accessible to the processor 405. Alternatively, or additionally, the processor 405 may be configured to execute hard-coded functionality. As such, whether configured by hardware or software methods, or by a combination thereof, the processor 405 may represent an entity (e.g., physically embodied in circuitry) capable of performing operations according to an embodiment of the present disclosure while configured accordingly. Alternatively, as another example, when the processor 405 is embodied as an executor of software instructions, the instructions may specifically configure the processor to perform the algorithms and/or operations described herein when the instructions are executed.

The communications circuitry 415 may be a device or circuitry embodied in either hardware or a combination of hardware and software that is configured to receive and/or transmit data from/to a network and/or any other device, circuitry, or module in communication with the elevator positioning system 100. For example, the communications circuitry 415 may be configured to communicate with one or more computing devices via wired (e.g., USB) or wireless (e.g., Bluetooth, Wi-Fi, cellular, and/or the like) communication protocols. In an example embodiment, the apparatus 400 communicates with a database or external device storing data for determining elevator car position within the elevator shaft 101. For example, the apparatus 400 may retrieve previously-collected frequency spectrum data and/or footprints thereof from a database via the communications circuitry 415. In some embodiments, the apparatus 400 communicates with the radar transceiver 106 via communications circuitry 415. Additionally or alternatively, the apparatus 400 may communicate with the radar transceiver via input/output circuitry 420, such as to obtain frequency spectrum data.

In some embodiments, the apparatus 400 (e.g., embodying the controller 150) may include input/output circuitry 420 that may, in turn, be in communication with the processor 405 to provide output to the user and, in some embodiments, to receive input such as a command provided by the user. The input/output circuitry 420 may comprise a user interface, such as a graphical user interface (GUI), and may include a display that may include a web user interface, a GUI application, a mobile application, a client device, or any other suitable hardware or software. In some embodiments, the input/output circuitry 420 may also include a display device, a display screen, user input elements, such as a touch screen, touch areas, soft keys, a keyboard, a mouse, a microphone, a speaker (e.g., a buzzer), a light emitting device (e.g., a red light emitting diode (LED), a green LED, a blue LED, a white LED, an infrared (IR) LED, an ultraviolet (UV) LED, or a combination thereof), or other input-output mechanisms. The processor 405, input/output circuitry 420 (which may utilize the processing circuitry), or both may be configured to control one or more functions of one or more user interface elements through computer-executable program code instructions (e.g., software, firmware) stored in a non-transitory computer-readable storage medium (e.g., memory 410). In some embodiments, the controller 150 does not interact directly with the user, the controller 150 may generate user interface data for display via input/output circuitry of one or more other devices with which one or more users directly interact and transmit the generated user interface data to one or more of those devices. For example, the controller 150, using user interface circuitry may generate user interface data for display by one or more display devices and transmit the generated user interface data to those display devices.

In various embodiments, the input/output circuitry 420 is configured for communicating with the radar transceiver 106 and may comprise circuitry such as transceiver signal processing circuitry. For example, input/output circuitry 420 includes circuitry such as transceiver signal processing circuitry that may be a device or circuitry embodied in either hardware or a combination of hardware and software that is configured to receive, process, generate, and/or transmit data, such as transceiver signal data generated by the transceiver. In various embodiments, the transceiver signal processing circuitry may be configured to receive and/or retrieve transceiver signal data from an exemplary transceiver. As described herein, in various embodiments, the transceiver signal data received by the input/output circuitry 420 may describe, for example, one or more reflections from one or more radar reflectors, such as, for example, a plurality of reflections produced by each radar reflector, and comprise signal data corresponding to each of the one or more reflections. In various example instances, the transceiver signal data received by the input/output circuitry 420 may further describe, for example, one or more reflections from other objects within the elevator shaft (e.g., rail fixtures 103, sidewalls 102, light fixtures, pulley mechanisms, support structures), and comprise signal data corresponding to each of the one or more reflections. As described, the transceiver signal data received by the input/output circuitry 420 and originating from the radar transceiver 106 may be in the form of frequency spectrum data, in various embodiments. In some example embodiments, the input/output circuitry

420, the transceiver signal processing circuitry, the processor 405, and/or the like are configured to generate frequency spectrum data based at least in part on processing the transceiver signal data (e.g., via Fourier transformation). In some examples, the transceiver signal processing circuitry comprised by the input/output circuitry 420 may be configured to execute one or more signal analysis processes to detect and classify, within frequency spectrum data and/or various other signals, signal characteristics such as frequency peaks.

In various embodiments, the input/output circuitry 420 may be configured to execute one or more of the operations described herein at two or more instances, so as to facilitate the receiving, processing, generating, and/or transmitting of transceiver signal data (e.g., frequency spectrum data) at various instances (e.g., runtimes) over time. In various embodiments, the input/output circuitry 420 may be configured to store at least a portion of the resultant data (e.g., in memory 410, in a database) corresponding to one or more of the operations described herein as historical system data that, for example, may be associated with one or more instances (e.g., an installation instance, a particular runtime). In such an exemplary circumstance, the apparatus 400 may be configured to access at least a portion of the historical system data (e.g., via the memory 410) in order to facilitate the execution of one or more operations described herein.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

Referring now to FIG. 5, a flowchart 500 describing various example operations for determining a position of the elevator car 105 within the elevator shaft 101 is illustrated. In particular, flowchart 500 describes various example operations for determining elevator car position using footprints that represent frequency spectrum data at each of a plurality of reference heights. In various embodiments, at least some of the example operations described by flowchart 500 may be performed for real-time determination of elevator car position during operation of the elevator car 105 (e.g., to transport people, cargo, and/or the like between different elevations or levels). In various embodiments, at least some of the example operations described by the flowchart 500 are performed by the controller 150 (e.g., embodied by the apparatus 400), and the controller 150 comprises means, such as processor 405, memory 410, communications circuitry 415, input/output circuitry 420, and/or the like, for performing example operations described by flowchart 500.

As illustrated, flowchart 500 includes block 502, at which the controller 150 is configured to determine reference frequency spectrum data for each of a plurality of reference heights along the elevator shaft. In various embodiments, the controller 150 may be configured to generate the reference frequency spectrum data from transceiver signal data collected during a calibration time period and/or collected previously. In some examples, the controller 150 receives, accesses, retrieves, and/or the like reference frequency spectrum data from a database, such as via communications circuitry 415. Similarly, in some examples, the controller 150 may receive, access, retrieve, and/or the like transceiver signal data in order to generate reference frequency spectrum data for reference heights.

In some example embodiments, the transceiver signal data from which the reference frequency spectrum data may be generated may be collected by the radar transceiver 106 of the elevator car 105 during calibration operation of the elevator car 105. For example, the elevator car 105 may traverse the elevator shaft 101 during calibration operation to various reference heights, as determined via an alternative positioning method or system, and the radar transceiver 106 may collect transceiver signal data at the various reference heights. In some other example embodiments, the transceiver signal data may be collected by an independent radar transceiver 106. As one non-limiting example, a user (e.g., an elevator technician) may manually position the independent radar transceiver 106 for collection of transceiver signal data at a reference height, and may cause collected transceiver signal data to be stored such that the collected transceiver signal data is accessible by the controller 150 (e.g., via user input, via communication with a database, via memory 410).

In various embodiments, the reference positions or heights at which transceiver signal data is collected for generation and determination of reference frequency spectrum data span the height of the elevator shaft 101. In some examples, the reference positions may be at least approximately uniformly spaced along the elevator shaft 101; as one non-limiting example, every 50 millimeters of the elevator shaft 101 is a reference position. In some example embodiments, the plurality of reference positions are each separated by a vertical distance between approximately 10 millimeters and approximately 150 millimeters. In some example embodiments, the plurality of reference positions are each separated by a vertical distance between approximately 30 millimeters and approximately 125 millimeters. In some example embodiments, the plurality of reference positions are each separated by a vertical distance between approximately 50 millimeters and approximately 100 millimeters. In various embodiments, the spacing of the reference positions along the elevator shaft 101 and the resulting number of reference positions may be defined based at least in part on computational and storage constraints of the controller 150 (e.g., memory 310) and/or of a database in which the transceiver signal data, the reference frequency spectrum data, and/or the footprints may be stored.

As previously discussed, multiple samples of transceiver signal data and frequency spectrum data at a specific reference height may have constant or consistent features based at least in part on the elevator shaft 101 having inherent and static infrastructure. To capture such constant or consistent features, in some example embodiments, a plurality of frequency spectrum data may be determined for each reference position. In some example embodiments, an average frequency spectrum data may be determined for each reference position.

Figure 6:
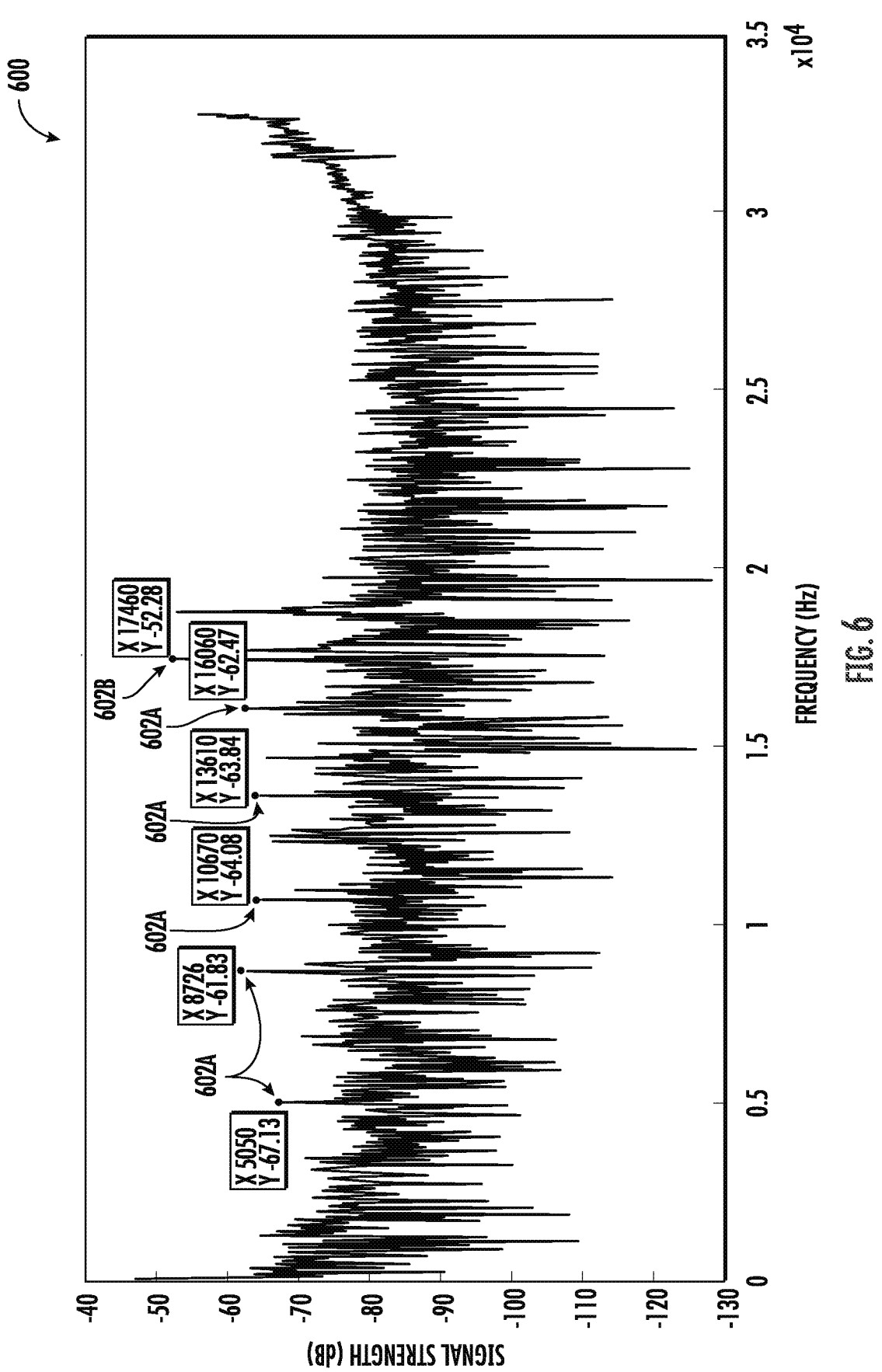
FIG. 6 illustrates example frequency spectrum data collected from a radar transceiver of an exemplary elevator positioning system, in accordance with various embodiments.

FIG. 6 illustrates example frequency spectrum data 600, and in the illustrated embodiment, the frequency spectrum data 600 may be reference frequency spectrum data collected at a reference position within the elevator shaft 101. As shown in FIG. 6, the frequency spectrum data 600 includes a plurality of frequency peaks 602, which may each correspond to radar signals reflected from different objects, including radar reflectors 110, rail fixtures 103, sidewalls 102 of the elevator shaft 101, and/or the like. In the illustrated embodiment, the frequency spectrum data 600 comprises frequency peaks 602A that correspond to radar signals reflected from rail fixtures 103 and further comprises one frequency peak 602B that corresponds to radar signals reflected from a radar reflector 110. As will be understood from radar reflectors 110 being configured for optimal reflection of radar signals and optimal detection of reflected radar signals, the frequency peak 602B associated with the radar reflector 110 may have a higher amplitude than the frequency peaks 602A associated with the rail fixtures 103.

In various embodiments, frequency peaks 602 of the frequency spectrum data 600 may be labelled according to whether or not they are associated with a radar reflector 110 (e.g., corresponding to radar signals reflected from the radar reflector 110). In various embodiments, a classification machine learning model may be configured and used to classify a frequency peak 602 of frequency spectrum data 600 as being associated with a radar reflector 110 or not. For example, the classification machine learning model may generate a predicted output of whether or not the frequency peak 602 is associated with a radar reflector 110 based at least in part on one or more other frequency peaks 602 within the frequency spectrum data 600, one or more frequency peaks 602 within one or more other samples of frequency spectrum data 600, manually-labelled frequency peaks 602, and/or the like. In various embodiments, statistical analysis may be performed on the frequency spectrum data 600 and/or on the frequency peaks 602 of the frequency spectrum data 600 to determine whether or not a frequency peak 602 is associated with a radar reflector 110. For example, the amplitude of a given frequency peak 602 may be evaluated against an average amplitude of frequency peaks 602, an average amplitude of the frequency spectrum data 600, standard deviations of peak amplitudes, and/or the like. In some example embodiment, the frequency peak 602 having the greatest amplitude may be predicted to be associated with a radar reflector 110.

Returning to FIG. 5, flowchart 500 further includes block 504, at which the controller 150 is configured to generate and associate a footprint with each reference position based at least in part on the plurality of frequency peaks within the reference frequency spectrum data for each reference position. In various embodiments, the controller 150 may generated and store footprints in memory 410 and/or in a database accessible by the elevator positioning system 100.

As discussed, the footprint may be a vector, a matrix, an array, a data object, a data structure, and/or the like. In various embodiments, the footprint serves as an efficient representation of frequency spectrum data 600. For example, while frequency spectrum data 600 may span approximately 30,000 discrete points in some examples, a footprint may approximately represent the frequency spectrum data 600 based at least in part on describing significant peaks within the frequency spectrum data 600. In various embodiments, a footprint for a reference frequency spectrum data associated with a reference position may be configured to describe a number of frequency peaks 602 of the reference frequency spectrum data. In some example embodiments, footprints for the reference positions describe a number of frequency peaks 602 of respective reference frequency spectrum data. In some other example embodiments, a footprint for a reference position may describe each frequency peak 602 of respective reference frequency spectrum data that satisfies one or more criteria (e.g., statistical-based criteria such as having a peak amplitude at least one standard deviation above an average amplitude).

Figure 7A:
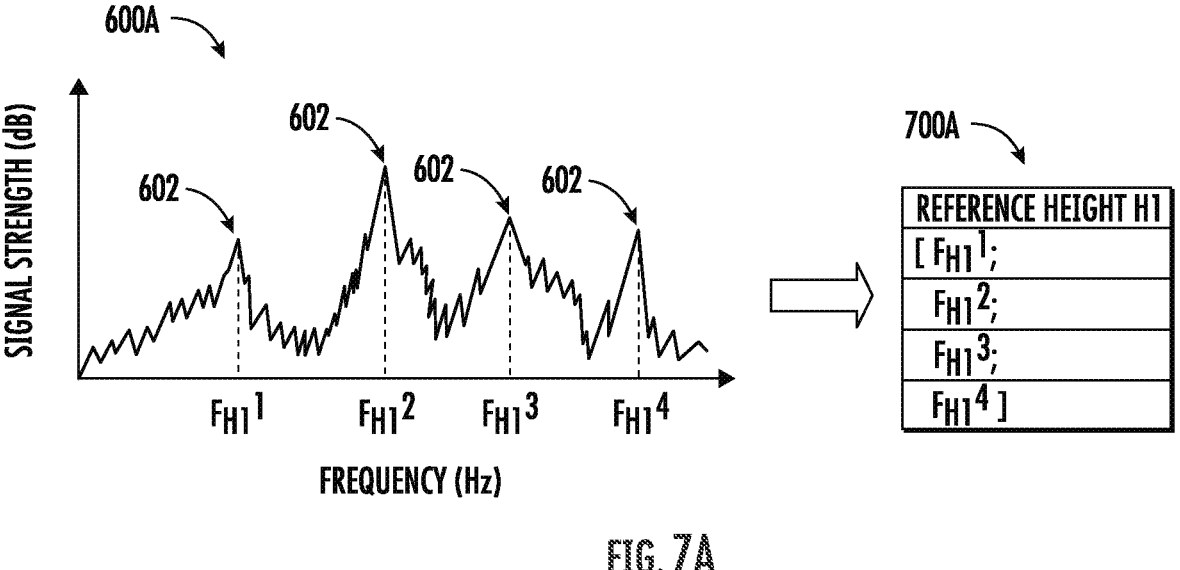
FIGS. 7A-B describe the generation of footprints from frequency spectrum data collected at different positions within an elevator shaft, in accordance with various embodiments of the present disclosure.
Figure 7B:
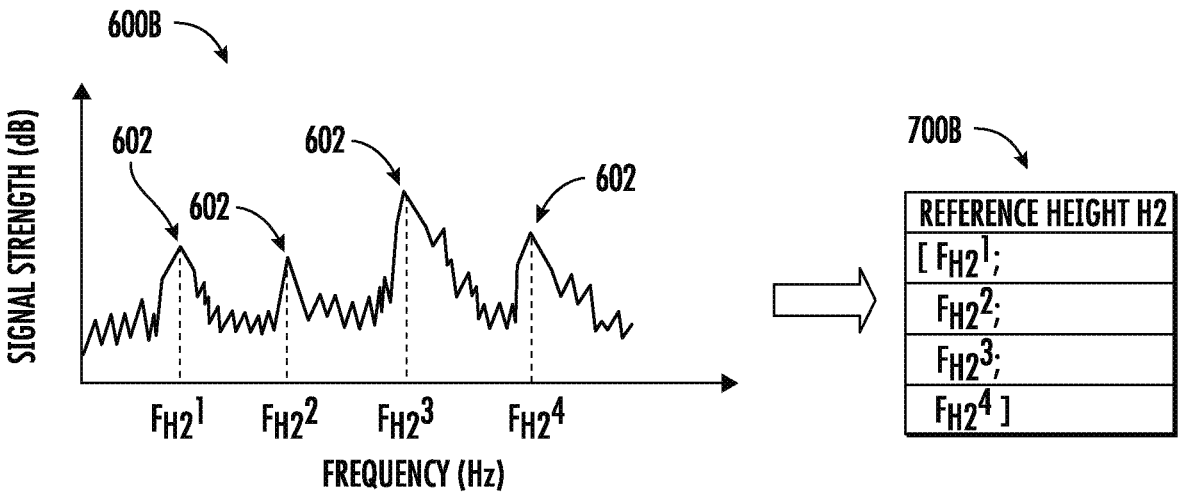

FIGS. 7A and 7B illustrate the generation of example footprints 700 that represent and describe the frequency spectrum data 600 at reference positions, such as by specifically describing frequency peaks 602 within the frequency spectrum data 600. FIG. 7A in particular illustrates generation of a first footprint 700A generated from first reference frequency spectrum data 600A collected at a first reference position $H_1$. In some examples, the first reference frequency spectrum data 600A may be an average of one or more samples of frequency spectrum data 600 collected at the first reference position $H_1$.

As shown in the illustrated embodiment, the first reference frequency spectrum data 600A includes four frequency peaks 602, and the four frequency peaks 602 may be in a pattern that is at least approximately consistent for the first reference position $H_1$ and unique for the first reference position $H_1$. For instance, the four frequency peaks 602 respectively have frequencies of $F_{H1}{}^1$, $F_{H1}{}^2$, $F_{H1}{}^3$, and $F_{H1}{}^4$, and the four frequency peaks 602 may be consistently located at such frequencies for frequency spectrum data 600 collected at the first reference position $H_1$, in some examples. Other characteristics and features of the four frequency peaks 602 may also be consistent for the first reference position $H_1$, and in some examples, such characteristics and features may further be unique to the first reference position $H_1$ compared to frequency spectrum data collected at different positions. In some examples, such characteristics and features may include bandwidth of a frequency peak, amplitude of a frequency peak, and/or the like.

Accordingly, in various embodiments, the first footprint 700A configured to represent and describe generally frequency spectrum data collected at the first reference position $H_1$ (e.g., the first reference frequency spectrum data 600A) may be generated to comprise the respective frequencies $F_{H1}{}^1$, $F_{H1}{}^2$, $F_{H1}{}^3$, and $F_{H1}{}^4$ of the four frequency peaks 602. For example, the first footprint 700A is a vector comprising the respective frequencies of frequency peaks of frequency spectrum data collected at the first reference position $H_1$. In various embodiments, the first footprint 700A additionally or alternatively describes other characteristics of the four frequency peaks 602, such as bandwidth of each frequency peak 602 and/or frequency of each frequency peak.

As previously discussed, the first footprint 700A may describe at least a subset of all frequency peaks 602 identified in the first reference frequency spectrum data 600A associated with the first reference position $H_1$. For example, a plurality of frequency peaks 602 are identified within the first reference frequency spectrum data 600A, and the first footprint 700A is configured to only describe a subset of the frequency peaks 602. In various embodiments, the subset of frequency peaks 602 described by the first footprint 700A may be based at least in part on a set or configured number of frequency peaks 602 (e.g., two, four, ten, fifteen, twenty, twenty-five, and/or the like) and/or may be based at least in part on certain criteria, such as a frequency bounds, threshold bandwidth, threshold amplitude, and/or the like. In some example embodiments, each footprint 700 may represent and describe between approximately two frequency peaks 602 and approximately one-hundred frequency peaks 602 within respective reference frequency spectrum data. In some example embodiments, each footprint 700 may represent and describe between approximately five frequency peaks 602 and approximately fifth frequency peaks 602 within respective reference frequency spectrum data. In some preferred example embodiments, each footprint may represent and described between approximately ten frequency peaks 602 and approximately twenty frequency peaks 602 within respective reference frequency spectrum data.

In various embodiments, the first footprint 700A may further include a classification tag for each described frequency peak that describes whether each described frequency peak is predicted to be associated with a radar reflector 110. As previously discussed, association with a radar reflector 110 may be predicted using a classification machine learning model; that is, the classification tag for each described frequency peak may be generated using the classification machine learning model. As will be appreciated, the frequency peaks represented and described by a footprint 700 may include frequency peaks corresponding to radar signals reflected from radar reflectors 110 as well as frequency peaks corresponding to radar signals reflected from other objects, such as rail fixtures 103, sidewalls 102, and/or the like.

Thus, the first footprint 700A may be configured to describe consistent features related to frequency peaks 602 in frequency spectrum data 600 collected at the first reference height $H_1$, and the first footprint 700A may be unique for the first reference height $H_1$ with respect to other footprints 700 for other heights. Inherently, for example, consistent features in frequency spectrum data 600 collected at a first reference height $H_1$ may be unique from or different than consistent features in frequency spectrum data 600 collected at a second reference height $H_2$, and thus, the first footprint 700A for the first reference height $H_1$ may be different from a second footprint 700B for a second reference height $H_2$.

FIG. 7B illustrates an example of a second footprint 700B generated to represent and describe frequency spectrum data collected at the second reference height $H_2$. In particular, FIG. 7B illustrates the second footprint 700B generated from second reference frequency spectrum data 600B collected at the second reference height $H_2$. As shown, the second reference frequency spectrum data 600B may include four frequency peaks, albeit with different characteristics such as frequency, bandwidth, amplitude, and/or the like. For example, in the illustrated embodiment, the frequency peaks 602 in the second reference frequency spectrum data 600B have frequencies of $F_{H2}^1$, $F_{H2}^2$, $F_{H2}^3$, and $F_{H2}^4$, which may have different values than frequencies $F_{H1}^1$, $F_{H1}^2$, $F_{H1}^3$, and $F_{H1}^4$, and the frequencies $F_{H2}^1$, $F_{H2}^2$, $F_{H2}^3$, and $F_{H2}^4$ may be captured in the second footprint 700B. Generally, the second footprint 700B may additionally or alternatively include peak bandwidths, peak amplitudes, and/or the like for a subset of frequency peaks 602 in the second reference frequency spectrum data 600B. In various embodiments, a plurality of footprints 700 may each describe the same characteristics of frequency peaks of respective reference frequency spectrum data collected at respective reference positions.

In various embodiments, at least blocks 502 and 504 may be performed on a periodic and/or intermittent basis, such that footprints 700 associated with reference heights may be occasionally updated. In some examples, the elevator shaft 101 may distort, flex, deform, and/or the like over time, and as such, the footprints 700 may be updated in order to accurately represent frequency spectrum data collected at reference heights within the elevator shaft 101. Similarly, various objects within the elevator shaft 101, such as radar reflectors 110, may experience movement over time, thus updating of the footprints 700 associated with the reference positions along the elevator shaft 101 ensures accurate information is used to determine a real-time position of an elevator car 105 within the elevator shaft 101.

Returning to FIG. 5, flowchart 500 further includes block 506, at which the controller 150 is configured to obtain real-time frequency spectrum data associated with the elevator car 105. In various embodiments, the controller 150 is configured to cause the radar transceiver 106 (e.g., via communications circuitry 415, via input/output circuitry 420) to collect transceiver signal data, and the controller 150 may be further configured to generate frequency spectrum data in substantially real-time as the transceiver signal data is collected. As such, the real-time frequency spectrum data may be substantially associated with a real-time position of the radar transceiver 106 and the elevator car 105.

As illustrated, flowchart 500 further includes block 508, at which the controller 150 is configured (e.g., using processor 405, memory 410) to determine an estimated position of the elevator car 105 based at least in part on comparing the real-time frequency spectrum data with a plurality of footprints associated with the reference heights. In various embodiments, the controller 150 may retrieve footprints from memory 410 and/or from a database via communications circuitry 415 for the comparison with real-time frequency spectrum data.

In some examples, the real-time frequency spectrum data is efficiently compared with the plurality of footprints; for example, the real-time frequency spectrum data is first compared with footprints that are associated with reference positions within a threshold distance of a previously-determined estimated position of the elevator car 105. For instance, the flowchart 500 is performed iteratively, with the estimated position that is determined at block 508 of each iteration being stored (e.g., in memory 410, in a database). Thus, an estimated position determined in a previous iteration or a previous timepoint may be used to provide efficiency in sequentially comparing the real-time frequency spectrum data with a plurality of footprints. In some example embodiments, the threshold distance may be user configured.

In particular, the real-time frequency spectrum data comprises frequency peaks 602, similar to the first reference frequency spectrum data 600A and the second reference frequency spectrum data 600B, and therefore can be compared with footprints that represent and describe characteristics and features of frequency peaks in frequency spectrum data collected at different known reference positions within the elevator shaft 101. Indeed, a representation of the real-time frequency spectrum data may be generated in accordance with generation of the footprints, such that the representation of the real-time frequency spectrum data can be compared directly with the footprints. For example, in one example embodiment, the footprints 700 of the reference positions are vectors of frequencies of the frequency peaks in respective previously-collected frequency spectrum data, and the representation of the real-time frequency spectrum data is likewise generated as a vector of frequencies of frequency peaks in the real-time frequency spectrum data. In one example embodiment, the footprints 700 and the representation of the real-time frequency spectrum data are similarly-dimensioned vectors, matrices, arrays, data objects, data structures, and/or the like, and similarity evaluation may be performed to measure similarity between the representation of the real-time frequency spectrum data and each footprint 700. For example, a similarity value can be determined using cosine similarity, least squares analysis, and/or the like.

Thus, in various embodiments, one footprint may be identified as being the most similar with the real-time frequency spectrum data (e.g., or the representation thereof), and the reference position associated with the one footprint may also be identified. Because the real-time frequency spectrum data is determined to be similar with reference frequency spectrum data previously collected at the reference position and represented by the one footprint, it may be assumed that the radar transceiver 106 and the elevator car 105 are positioned at the reference position at the time that the real-time frequency spectrum data was obtained or generated. Thus, the reference position may serve as a coarse estimate of the position of the elevator car 105 within the elevator shaft 101, in various example embodiments.

In various embodiments, the coarse estimate of elevator car position (e.g., that is the reference position) can be further refined with additional accuracy. In various embodiments, the footprint 700 associated with the reference position and that is determined to be similar with the real-time frequency spectrum data is used to identify a particular frequency peak within the real-time frequency spectrum data. Specifically, the particular frequency peak within the real-time frequency spectrum data is associated with a radar reflector 110, and as such, the particular frequency peak can be used to determine a higher-resolution estimate of elevator car position (e.g., based at least in part on a known position of the radar reflector 110).

In various embodiments, the particular frequency peak associated with the radar reflector 110 is identified based at least in part on classification tags of the similar footprint 700 which identify which frequency peaks 602 are predicted to correspond with radar signals reflected from a radar reflector 110. That is, the footprint 700 may represent a frequency peak 602 indicated as being associated with a radar reflector 110 by a classification tag, and as such, a frequency peak within the real-time frequency spectrum data corresponding to the frequency peak 602 is also identified as being associated with the radar reflector 110. For example, the footprint 700 may indicate that a particular sequentially indexed frequency peak (e.g., the first frequency peak within a spectrum, the second frequency peak within a spectrum, and/or the like), a frequency peak at and/or near a particular frequency, and/or the like is associated with the radar reflector 110, and a similar frequency peak within the real-time frequency spectrum data can then be easily identified.

Following identification of the frequency peak within the real-time frequency spectrum data that is associated with the radar reflector 110, a fine estimate of elevator car position can be determined (e.g., based at least in part on a known or given position of the radar reflector 110) and can supplement or replace the previous coarse estimate, in various embodiments. In various embodiments, the radar reflector 110 associated with the identifier frequency peak and that is used to determine an elevator car position is one of a plurality of radar reflectors 110 positioned in a cascading arrangement in which at least one radar reflector 110 is within a maximal working distance or signal range of the radar transceiver 106. In accordance with various embodiments described herein then, footprints representing characteristics or features of frequency spectrum data collected at reference heights are used to finely and accurately determine a real-time position of the elevator car 105 within the elevator shaft 101.

In various embodiments, at least some of the example operations described by flowchart 500 for determining a position of the elevator car 105 within the elevator shaft 101 may be performed continuously and repeatedly during normal operation of the elevator car 105, such as during transport of people and/or cargo between different elevations and levels within the elevator shaft. In some example embodiments, obtaining real-time frequency spectrum data and determination of elevator car position (e.g., at blocks 506 and 508) is performed iteratively and periodically according to a configurable frequency, such that a real-time position of the elevator car 105 can be tracked with high resolution.

As described herein then, various embodiments are directed to determining a position of an elevator car 105 within an elevator shaft 101 using a plurality of footprints that represent and describe frequency spectrum data for a plurality of reference heights. Various embodiments as described herein provide technical effects and technical advantages in improving the accuracy and efficiency of elevator car positioning. Use of footprints that comprehensively or holistically describe frequency spectrum data including various frequency peaks that may represent radar signal reflections from various different objects within the elevator shaft 101 and/or that may result from multi-path interference reduces overall difficulty in determining an elevator car position and precludes a need to clearly identify one frequency peak associated with a radar reflector 110. Further, identification of reference heights through comparison of real-time frequency spectrum data with footprints precludes a need for a known or given initial position of the elevator car 105 in tracking mechanisms and applications. Thus, various embodiments provide improved applicability in determining a real-time position of the elevator car 105 within the elevator shaft 101, and various technical challenges related to determining elevator car position are overcome.

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for determining a position of an elevator car within an elevator shaft, the method comprising:
   determining reference frequency spectrum data for each of a plurality of reference positions along the elevator shaft;
   generating a footprint associated with each reference position based at least in part on a plurality of frequency peaks within the reference frequency spectrum data for each reference positions;
   obtaining real-time frequency spectrum data associated with the elevator car within the elevator shaft; and
   determining an estimated position of the elevator car based at least in part on comparing the real-time frequency spectrum data with a plurality of footprints associated with the plurality of reference positions, wherein determining the estimated position of the elevator car comprises:
      determining a coarse position estimate of the elevator car based at least in part on a reference position having a footprint that is determined to be similar to the real-time frequency spectrum data;
      identifying a particular frequency peak within the real-time frequency spectrum data using the reference position, wherein the particular frequency peak corresponds to a radar reflector positioned within the elevator shaft; and
      determining a fine position estimate of the elevator car using the particular frequency peak within the real-time frequency spectrum data.

2. The method of claim 1, wherein the real-time frequency spectrum data is first compared with one or more footprints associated with one or more reference positions within a threshold distance of a previously-determined fine position estimate of the elevator car.

3. The method of claim 1, wherein comparing the real-time frequency spectrum data with a given footprint comprises determining a similarity value between the given footprint and a representation of a plurality of frequency peaks within the real-time frequency spectrum data.

4. The method of claim 1, wherein the footprint associated with a given reference position comprises a frequency value and a classification tag for at least a subset of the plurality of frequency peaks within the reference frequency spectrum data for the given reference position.

5. The method of claim 4, wherein the classification tag for a respective frequency peak describes whether or not the respective frequency peak is associated with a received radar signal reflected from a radar reflector within the elevator shaft.

6. The method of claim 1, wherein the real-time frequency spectrum data is obtained using a radar transceiver attached to the elevator car.

7. An apparatus for determining a position of an elevator car within an elevator shaft, the apparatus comprising a processor and a memory storing executable instructions, wherein the executable instructions are configured to, with the processor, cause the apparatus to:
   determine reference frequency spectrum data for each of a plurality of reference positions along the elevator shaft;

generate a footprint associated with each reference position based at least in part on a plurality of frequency peaks within the reference frequency spectrum data for each reference positions;

obtain real-time frequency spectrum data associated with the elevator car within the elevator shaft; and determine an estimated position of the elevator car based at least in part on comparing the real-time frequency spectrum data with a plurality of footprints associated with the plurality of reference positions, wherein determining the estimated position of the elevator car comprises:

determining a coarse position estimate of the elevator car based at least in part on a reference position having a footprint that is determined to be similar to the real-time frequency spectrum data;

identifying a particular frequency peak within the real-time frequency spectrum data corresponding to a radar reflector using the reference position; and determining a fine position estimate of the elevator car using the particular frequency peak within the real-time frequency spectrum data.

8. A computer program product comprising at least one non-transitory computer-readable storage medium having computer-executable program code portions stored therein, the computer-executable program code portions comprising program code instructions configured to:

determine reference frequency spectrum data for each of a plurality of reference positions along an elevator shaft;

generate a footprint associated with each reference position based at least in part on a plurality of frequency peaks within the reference frequency spectrum data for each reference positions;

obtain real-time frequency spectrum data associated with the elevator car within the elevator shaft; and determine an estimated position of the elevator car based at least in part on comparing the real-time frequency spectrum data with a plurality of footprints associated with the plurality of reference positions, wherein determining the estimated position of the elevator car comprises:

determining a coarse position estimate of the elevator car based at least in part on a reference position having a footprint that is determined to be similar to the real-time frequency spectrum data;

identifying a particular frequency peak within the real-time frequency spectrum data corresponding to a radar reflector using the reference position; and determining a fine position estimate of the elevator car using the particular frequency peak within the real-time frequency spectrum data.

* * * * *